United States Patent [19]

Mizota

[11] Patent Number: 4,713,809

[45] Date of Patent: Dec. 15, 1987

[54] TIME DIVISION MULTIPLE ACCESS RADIO COMMUNICATIONS SYSTEM

[75] Inventor: Yasuhiro Mizota, Tokyo, Japan

[73] Assignee: NEC Corporation, Japan

[21] Appl. No.: 888,587

[22] Filed: Jul. 21, 1986

[30] Foreign Application Priority Data

Jul. 25, 1985 [JP] Japan .................................. 60-165470

[51] Int. Cl.⁴ .......................... H04B 3/36; H04B 7/14
[52] U.S. Cl. ........................................ 370/97; 370/26; 455/18
[58] Field of Search ................... 370/26, 97; 375/3, 4; 379/59, 342; 455/17, 33, 56, 18

[56] References Cited

U.S. PATENT DOCUMENTS 4,380,816 4/1983 Nicholls ................................ 455/18
4,490,818 12/1984 Otsuka .................................. 455/18

Primary Examiner—Douglas W. Olms
Assistant Examiner—Wellington Chin
Attorney, Agent, or Firm—Laff, Whitesel, Conte & Saret

[57] ABSTRACT

In a time division multiple access radio communication system constituted by a plurality of repeater stations and a plurality of terminals, only when the time slot in both the upward and downward directions is identical in a repeater station, the repeater station repeats data in the time slot. Downward data of a time slot used by a subscriber in an upward zone is not repeated to downward repeater stations, thereby saving power.

6 Claims, 7 Drawing Figures

TIME DIVISION MULTIPLE ACCESS RADIO COMMUNICATIONS SYSTEM

BACKGROUND OF THE INVENTION

The present invention relates to a Time Division Multiple Access (TDMA) radio communication system and, more particularly, to a repeater station in the TDMA radio comunication system.

A system of this type is normally constituted by an exchanger connected to a plurality of subcribers, a base station which is connected to the exchanger and has a radio transmitter/receiver so as to link the radio subscribers within its service zone (home zone) with the exchanger, and a plurality of repeater stations which have individual home zones and provides repeater services to the radio subscribers within the corresponding home zones. The repeater station closer to the base station is referred to as a "higher" repeater station towards the others, and the repeater station at longer distance from the base station than others is referred to as a "lower" repeater station towards the others.

Each repeater station has a downward receiver for receiving a downward signal from the higher repeater station, a downward transmitter for transmitting the downward signal to the lower repeater station, an upward receiver for receiving an upward signal from the lower repeater station, and an upward transmitter for transmitting the upward signal to the higher repeater station.

Communication between subscribers is time-divisionally performed, and at least one time slot is assigned to one communication (single speech or data).

Conventionally, when a radio subscriber in the home zone of a higher repeater station communicates with a subscriber connected to the exchanger via the base station, the downward transmitter of the higher repeater station is operated over all the time slots. More specifically, even though a subscriber in the home zone of a lower repeater station does not perform communication, a downward transmitter of the higher repeater station is driven, thus wasting power.

SUMMARY OF THE INVENTION

It is an object of the present invention to provide a TDMA radio communication system which is free from the conventional drawbacks, and can reduce power consumption in repeater stations.

According to the present invention, there is provided a TDMA radio communication system comprising: one base station; a plurality of repeater stations for sequentially repeating a radio signal received by and transmitted from the base station; and a plurality of terminals for communicating the radio signal with the base station via the repeater stations, each of the repeater stations including repeater means for repeating the radio signal using a time slot assigned to each of the terminals, wherein each of the repeater stations further comprises means for detecting a time slot in upward communication, and means for activating the repeater means in association with only a time slot in downward communication corresponding to the detected time slot in upward communication.

DETAILED DESCRIPTION OF THE PREFERRED EMBODIMENT

Figure 1:
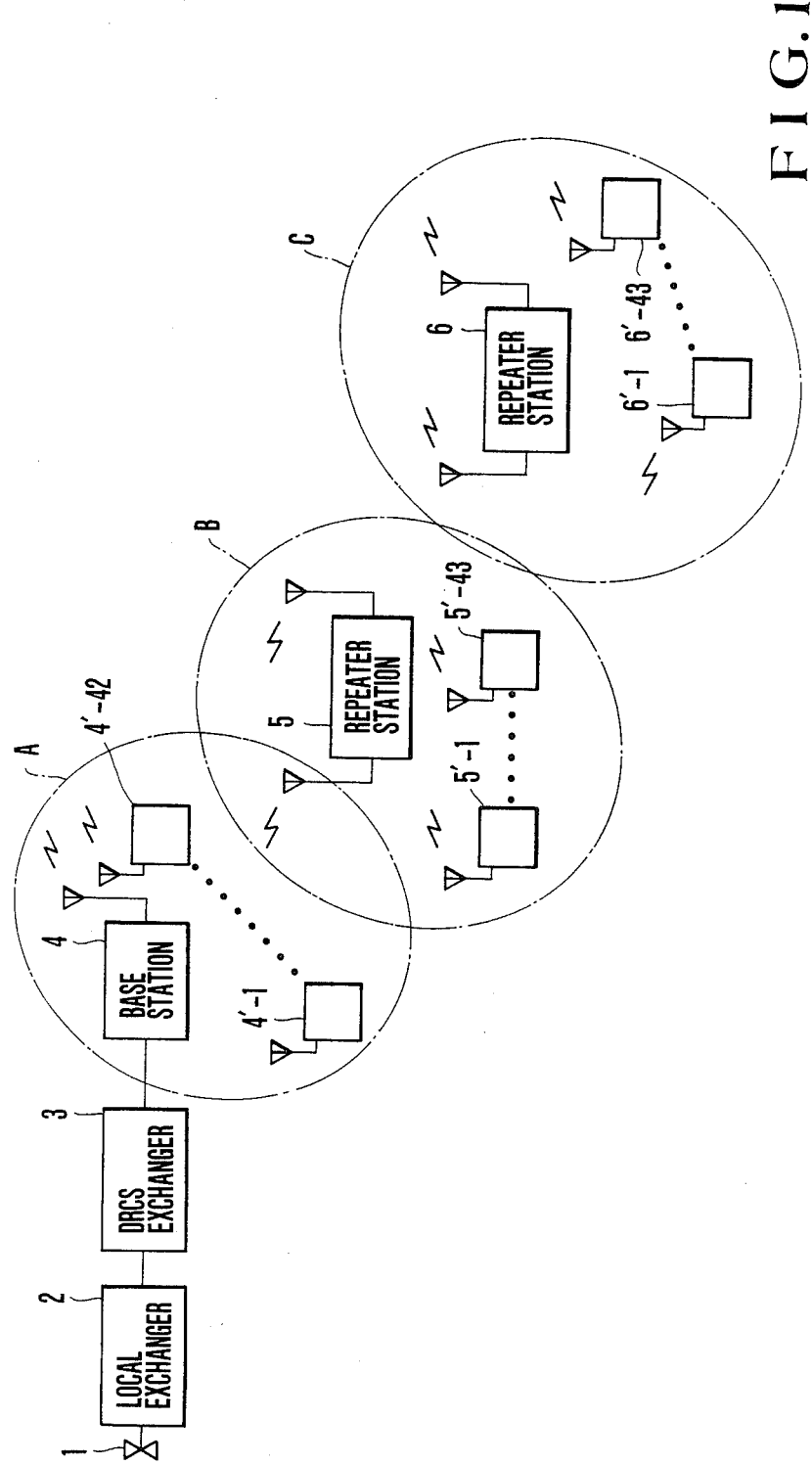
FIG. 1 is a block diagram showing the overall arrangement of a TDMA radio communication system according to the present invention.

FIG. 1 is a block diagram for explaining the overall arrangement of a TDMA communication system according to the present invention. This system can serve for 128 radio subscribers.

Referring to FIG. 1, a plurality of subscriber's telephones 1 are connected to a local exchanger 2 through corresponding subscriber's lines. The local exchanger 2 is connected to a base station 4 through a DRCS (Digital Radio Communication System) exchanger 3. The base station 4 has a transmitter/receiver, and can provide services to 42 radio subscribers 4'-1 to 4'-42 within a home zone A. The base station 4 is radio-connected to a distant repeater station 5 (to be described later). The repeater station 5 has a home zone B and can provide services to 43 subscriber's radio terminals 5'-1 to 5'-43 within the home zone B. The repeater station 5 is radio-connected to another repeater station 6, which can provide repeater services to 43 subscriber's radio terminals 6'-1 to 6'-43 within its home zone C. Each of the repeater stations 5 and 6 has an upward transmitter, an upward receiver, a downward transmitter, and a downward receiver including antennas. In this instance, the repeater stations 5 and 6 are higher and lower repeater stations, respectively.

Each radio subscriber in the home zone A, B, or C is connected with the repeater station in the corresponding home zone.

Figure 2:
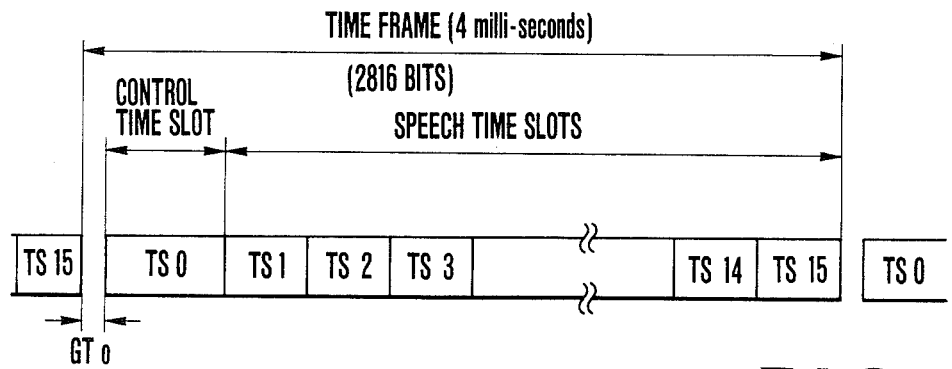
FIG. 2 shows a format of a downward frame configuration used in the present invention.

FIG. 2 shows a frame configuration used in this system.

As shown in FIG. 2, one downward frame has a 4-ms (2,816-bit) configuration, and consists of a guard time GT0 (22 bits), a control time slot TS0 (304 bits), and fifteen 166-bit speech time slots TS1 to TS15.

Figure 3:
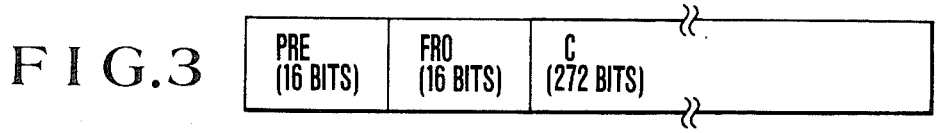
FIG. 3 shows a bit configuration of a control time slot shown in FIG. 2.

The control time slot TS0 has a bit configuration shown in FIG. 3, which includes a preamble PRE (16 bits), a frame synchronization FR0 (16 bits), and control information C (272 bits).

Figure 4A:
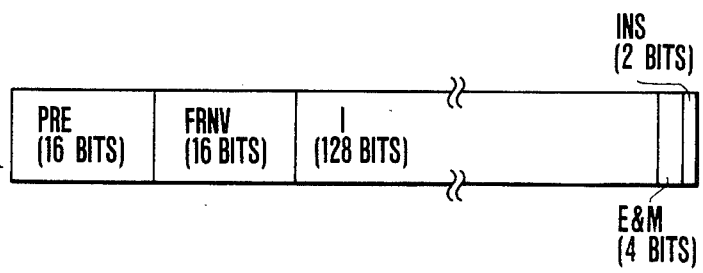
FIGS. 4A and 4B show bit configurations of respective time slots.
Figure 4B:
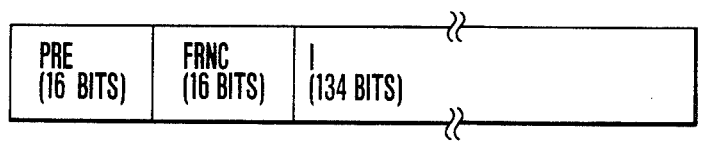

FIGS. 4A and 4B show bit configurations of time slots of speech and data, respectively. Referring to FIGS. 4A and 4B, reference symbol FRNV denotes a time slot synchronization voice start code word; FRNC, a time slot synchronization data start code word; I, speed or data information; and E & M and INS, additional speech information.

In the system shown in FIG. 1, the control time slot TS0 is always transmitted. If the 15 time slots are equally assigned to the three service zones A, B, and C, each zone can use five time slots. For example, the time slots TS1 to TS5, TS6 to TS10, and TS11 to TS15 are respectively assigned to the zones A, B, and C. It should be noted that the time slots may be assigned to each zone by using so-called demand-assign technique.

Figure 5:
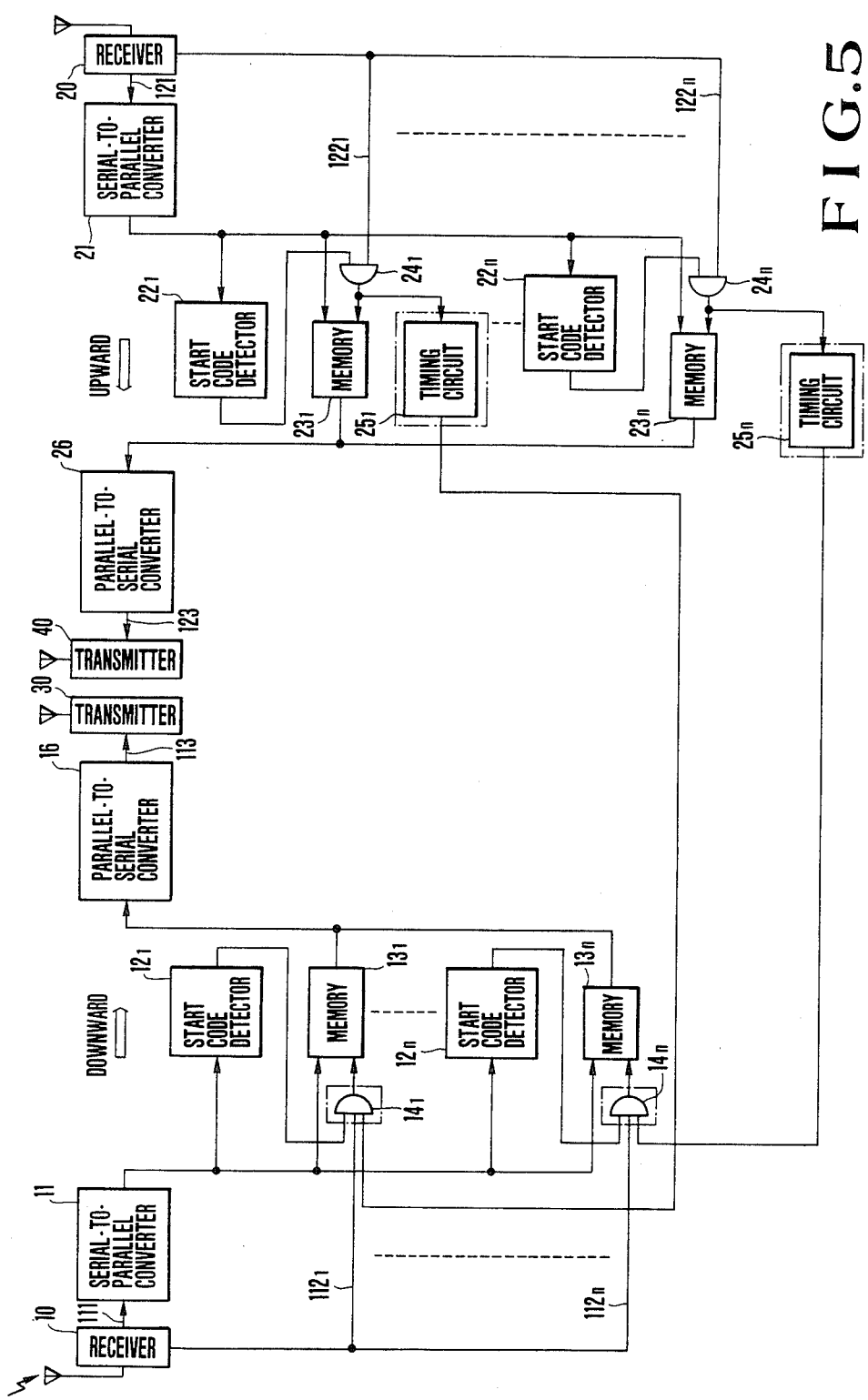
FIG. 5 is a block diagram showing an arrangement of a repeater station shown in FIG. 1.

FIG. 5 shows the arrangement of the repeater station 5 in the system shown in FIG. 1.

Referring to FIG. 5, the output terminal of a downward receiver 10 is connected to the input terminal of a serial-to-parallel converter 11. The serial-to-parallel converter 11 receives serial input data and outputs parallel data for each data corresponding to each time slot. The converter 11 supplies the parallel data for each time slot to those of start code detectors $12_1$ to $12_n$ (in this case, n is 15) and random-access memories (RAMs) $13_1$ to $13_n$ which correspond with the time slot. The output terminals of the start code detectors $12_1$ to $12_n$ are respectively connected to the first input terminals of corresponding AND gates $14_1$ to $14_n$. The second input terminals of the AND gates $14_1$ to $14_n$ respectively receive downward squelch signals $112_1$ to $112_n$ from the receiver 10. Furthermore, the third input terminals of the AND gates $14_1$ to $14_n$ respectively receive the output signals from timing circuits $25_1$ to $25_n$ (to be described later). The output terminals of the AND gates $14_1$ to $14_n$ are respectively connected to the control input terminals of the corresponding memories $13_1$ to $13_n$. Parallel data from memories $13_1$ to $13_n$ are respectively supplied to the input terminal of parallel-to-serial converter 16. Downward serial transmission data 113 is supplied from the parallel-to-serial converter 16 to a downward transmitter 30.

Meanwhile, the output terminal of an upward receiver 20 is connected to the input terminal of a serial-to-parallel converter 21. The output from the serial-to-parallel converter 21 is supplied to those of start code detectors $22_1$ to $22_n$ and memories $23_1$ to $23_n$ corresponding to each time slot. The output terminals of the start code detectors $22_1$ to $22_n$ are respectively connected to one input terminals of AND gates $24_1$ to $24_n$. The other input terminals of the AND gates $24_1$ to $24_n$ respectively receive upward squelch signals $122_1$ to $122_n$ from the receiver 20. The output terminals of the AND gates $24_1$ to $24_n$ are respectively connected to the control input terminals of the corresponding memories $23_1$ to $23_n$ and the input terminals of the timing circuits $25_1$ to $25_n$. Parallel data from the memories $23_1$ to $23_n$ are supplied to the input terminal of parallel-to-serial converter 26. Upward serial transmission data 123 converted is supplied from parallel-to-serial converter 26 to an upward transmitter 40.

The operation of the repeater station 5 shown in FIG. 5 will now be described.

Reception data received and demodulated by the downward receiver 10 is input to the serial-to-parallel converter 11. The input data converted to parallel data by the converter 11 is input to those of the start code detectors $12_1$ to $12_n$ and the memories $13_1$ to $13_n$ which correspond with its time slot. When the start codes (FIGS. 4A and 4B) are detected from the corresponding time slots, the start code detectors $12_1$ to $12_n$ produce High-level ("H") output signals. The receiver 10 sets to "H" level the downward squelch signals $112_1$ to $112_n$ during reception of the input signals. However, the outputs from the AND gates $14_1$ to $14_n$ will not go "H" simply upon detection of the start codes of the corresponding time slots and setting of the squelch signals at "H" level. More specifically, the outputs from the AND gates $14_1$ to $14_n$ go "H" only when the "H" signals are supplied thereto from the corresponding timing circuits $25_1$ to $25_n$. Then, the data supplied from the corresponding memories $13_1$ to $13_n$ is output through the parallel-to-serial converter 16 to the downward transmitter 30.

The timing circuits $25_1$ to $25_n$ produce "H" output signals as follows. The reception data from the downward repeater station 6 (FIG. 1) is input to the serial-to-parallel converter 21, and the outputs therefrom are respectively supplied to the start code detectors $22_1$ to $22_n$ and the memories $23_1$ to $23_n$. When the upward reception squelch signals and the start codes are detected, the outputs from the AND gates $24_1$ to $24_n$ corresponding to the respective time slots go to "H" level. Then, data from the memories $23_1$ to $23_n$ are transmitted from the upward transmitter 40 through the parallel-to-serial converter 26. At the same time, the "H" outputs from the AND gates $14_1$ to $14_n$ are also supplied to the corresponding timing circuits $25_1$ to $25_n$, and the "H" signals are supplied from the timing circuits $25_1$ to $25_n$ to the third input terminals of the corresponding AND gates $14_1$ to $14_n$. More specifically, the repeater station 5 monitors both the upward and downward start codes, and repeats the downward data only for the time slot in which both the upward and downward start codes are detected.

Figure 6:
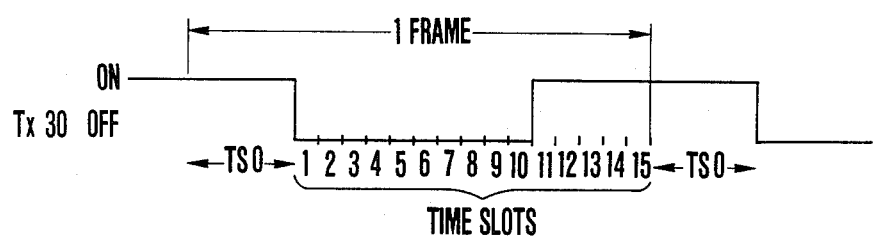
FIG. 6 is a timing chart for explaining the effect of the present invention.

FIG. 6 shows the operating state of the downward transmitter 30 in the higher repeater station 5 during communication of the lower repeater station 6. As can be seen from FIG. 6, the transmitter 30 of the repeater station 5 is turned on only in the time slots TS11 to TS15 which are assigned to the home zone C of the repeater station 6, and is turned off in other time slots TS1 to TS10. Therefore, power consumed by the transmitter 30 is expressed by:

$$(304 + 166 \times 5)/2816 = 1134/2816 = 0.40$$

In this manner, about a 60% of power saving is obtained when compared with a conventional technique in which the transmitter is turned on in all the time slots.

About 20% to 25% of total power is expected to be saved when considering power consumed by the upward and downward transmitters/receivers, a control panel, and the like mounted on the repeater station.

As can be understood from the above embodiment, the present invention is very effective to reduce the power consumption of the higher repeater stations when a large number of repeater stations are installed.

What is claimed is:

1. A time division multiple access radio communication system comprising:
    one base station;
    a plurality of repeater stations for sequentially repeating a radio signal received by and transmitted from said base station; and
    a plurality of terminals for communicating the radio signal with said base station via said repeater stations,
    each of said repeater stations including repeater means for repeating the radio signal using a time slot assigned to each of said terminals, wherein
    each of said repeater stations further comprises means for detecting a time slot in upward communication, and means for activating said repeater means in association with only a time slot in downward communication corresponding to the detected time slot in upward communication.

2. A system according to claim 1, wherein said repeater means comprises memory means for storing upward and downward reception signals; means for detecting a time slot in use; means for controlling a readout operation of said memory means corresponding to the detected time slot; and means for transmitting the output from said memory means.

3. A system according to claim 2, wherein said means for activating said repeater means comprises a timing circuit for generating a control signal in accordance with the output from said time slot detecting means for detecting a time slot in upward communication, and means for enabling the output from said memory means in accordance with the control signal.

4. A system according to claim 2, wherein said time slot detecting means includes a circuit for detecting a start code of each time slot.

5. A system according to claim 2, wherein said memory means includes a random-access memory provided for each time slot.

6. A system according to claim 3, wherein said means for enabling the output from said memory means includes an AND circuit which receives the output from said timing circuit as one input.

* * * * *